US00RE43867E

(19) United States
(12) Reissued Patent
Wilson et al.

(10) Patent Number: US RE43,867 E
(45) Date of Reissued Patent: Dec. 18, 2012

(54) ROCKET ASSEMBLY ABLATIVE MATERIALS FORMED FROM, AS A PRECURSOR, STAPLE CELLULOSIC FIBERS, AND METHOD OF INSULATING OR THERMALLY PROTECTING A ROCKET ASSEMBLY WITH THE SAME

(75) Inventors: Kenneth P. Wilson, Corinne, UT (US); Shelley Rawding, legal representative, White Salmon, WA (US); John K. Shigley, Ogden, UT (US); Allan P. Thompson, Tremonton, UT (US)

(73) Assignee: Alliant Techsystems Inc., Arlington, VA (US)

(21) Appl. No.: 10/444,056

(22) Filed: May 22, 2003

Related U.S. Patent Documents

Reissue of:
(64) Patent No.: 6,235,359
Issued: May 22, 2001
Appl. No.: 09/377,186
Filed: Aug. 19, 1999

U.S. Applications:
(60) Provisional application No. 60/124,674, filed on Mar. 16, 1999, provisional application No. 60/097,117, filed on Aug. 19, 1998.

(51) Int. Cl.
*B32B 9/00* (2006.01)

(52) U.S. Cl. ..... 428/36.1; 428/34.5; 428/218; 428/402; 428/408; 428/920; 428/353; 428/370; 442/361; 442/324; 427/230; 427/239

(58) Field of Classification Search ..... 428/402, 428/408.902, 178, 36.1, 34.5, 218; 442/367, 442/324; 427/236, 239
See application file for complete search history.

(56) References Cited

U.S. PATENT DOCUMENTS

| | | | | |
|---|---|---|---|---|
| 3,108,018 | A | | 10/1963 | Lewis |
| 4,016,322 | A | | 4/1977 | Haldeman |
| 4,275,095 | A | | 6/1981 | Warren |
| 4,284,615 | A | * | 8/1981 | Maruyama ..... 423/447.4 |
| 4,286,013 | A | | 8/1981 | Daroga et al. |
| 4,507,165 | A | | 3/1985 | Herring |
| 4,595,714 | A | | 6/1986 | McAllister et al. |
| 4,663,065 | A | | 5/1987 | Herring |
| 4,666,084 | A | | 5/1987 | Mitchell et al. |
| 4,878,431 | A | | 11/1989 | Herring |
| 4,912,178 | A | | 3/1990 | Boinot et al. |
| 4,954,394 | A | | 9/1990 | Boinot et al. |
| 4,956,397 | A | | 9/1990 | Rogowski et al. |
| 5,360,669 | A | | 11/1994 | Noland et al. |
| 5,767,221 | A | | 6/1998 | Poulter et al. |

FOREIGN PATENT DOCUMENTS

| | | |
|---|---|---|
| DE | 27 22575 | 8/1999 |
| GB | 2 295 396 | 3/1996 |

* cited by examiner

*Primary Examiner* — Richard C Weisberger
(74) *Attorney, Agent, or Firm* — TraskBritt

(57) ABSTRACT

A rocket motor assembly is insulated or thermally protected with a rocket motor ablative material formed from a prepreg. The prepreg contains at least an impregnating resin matrix and, as a precursor prior to carbonization, carded and spun staple cellulosic fibers. When patterned and carbonized, the rocket motor ablative material can be lined or otherwise placed into a rocket motor assembly, such as between the solid propellant and case, in the bulk area of the exit nozzle liner, or at susceptible portions of a re-entry vehicle, such as the nose cone.

22 Claims, 3 Drawing Sheets

ROCKET ASSEMBLY ABLATIVE MATERIALS FORMED FROM, AS A PRECURSOR, STAPLE CELLULOSIC FIBERS, AND METHOD OF INSULATING OR THERMALLY PROTECTING A ROCKET ASSEMBLY WITH THE SAME

Matter enclosed in heavy brackets [ ] appears in the original patent but forms no part of this reissue specification; matter printed in italics indicates the additions made by reissue.

RELATED U.S. APPLICATIONS

Priority is based on U.S. Provisional Application No. 60/124,674 filed on Mar. 16, 1999 and U.S. Provisional Application No. 60/097,117 filed on Aug. 19, 1998, the complete disclosures of which are incorporated herein by reference.

ORIGIN OF THE INVENTION

Certain aspects of this invention were made under contract NAS 8-38100 with the National Aeronautics and Space Administration.

BACKGROUND OF THE INVENTION

1. Field of the Invention

This invention relates to rocket motor ablative materials, especially resin-filled carbon fiber and carbon/carbon ablative materials, and a method of making the ablative materials. In particular this invention relates to carbon ablative materials having a reinforcement component formed from, as a precursor prior to carbonization, carded and yarn-spun staple cellulosic fibers. This invention also relates to rocket motor assemblies including the carbon ablative materials.

2. Description of the Related Art

It is generally accepted current industry practice to prepare insulation for solid propellant rocket motors from a polymeric base composite importantly including a carbon cloth. The composite is generally composed of the carbon cloth as a woven reinforcement structure impregnated with a suitable resin matrix. The resin matrix is commonly a phenolic resin, although other resin matrices can be used. For making the woven reinforcement structure, current industry practice is to select a continuous filament non-solvent spun viscose rayon as a precursor material. The continuous filament viscose rayon, which is especially formulated for ablative applications, is woven, wound, or otherwise manipulated into its desired configuration and then carbonized to form a carbon structure exhibiting superior ablation characteristics and excellent physical properties and processability.

Continuous filament viscose rayon precursor has been established as a standard in the rocket motor industry for making carbon reinforced structures of carbon and carbon/carbon ablative materials due to its superior ablation characteristics, excellent physical and thermal properties, and high processability. One of the excellent physical properties possessed by composites formed from continuous filament viscose rayon precursor is a cured composite high warp strength of about 144.8 MPa (or about 21,000 lbs/in$^2$) at ambient temperature (about 21° C. or 70° F.), as measured subsequent to carbonization and impregnation of the precursor. Warp strength reflects the tolerance of the filament to opposing forces acting along the warp (or longitudinal) filament axis.

However, a major drawback associated with the use of cured composites comprising wrapped layers of continuous filament viscose rayon, such as found within the bulk areas of much rocket nozzle insulation, is the relative low across-ply tensile strength possessed by the carbonized continuous filament viscose rayon at operating temperatures experienced within the bulk ablative material (as opposed to the exhaust gas surface) during firing of a rocket motor. Such firing temperatures within the bulk ablative material generally can rise to about 400° C. (or 750° F.). Specifically, cured composites comprising wrapped layers of carbonized continuous filament viscose rayon have across-ply tensile strengths on the order of about 2.07 MPa (or about 300 lbs/in$^2$). As referred to herein, across-ply tensile strength is the amount of load, perpendicular to the filament axes, which two overlapping layers of filaments can withstand prior to slippage.

Another significant drawback associated with continuous filament viscose rayon that has recently drawn significant attention involves the availability of this particular type of continuous filament. Over the past few years, the only manufacturer producing sufficient quantities of continuous filament viscose rayon to meet industry demands is North American Rayon Corp. (NARC) of Elizabethton, Tenn. The capability of the industry to produce ablative liners and other thermal insulation based on continuous filament viscose rayon has been jeopardized, however, due to the cessation of continuous filament viscose fiber production by NARC. There is therefore a need in this industry, previously not satisfied, to find an effective alternate source or a replacement candidate for the above-described standard thermal insulation formed from continuous filament viscose rayon precursor.

The requirements that a replacement candidate must satisfy in order to be acceptable and functionally effective are well known to be quite severe due to the extreme conditions to which the insulation is exposed. These conditions not only include exceedingly high temperatures but also severe ablative effects from the hot particles (as well as gases) that traverse and exit the rocket motor interior, or over the outer surface of re-entry vehicle insulators. Unless the insulation will withstand such conditions, catastrophic failure may (and has) occurred.

Accordingly, any replacement insulation should exhibit comparable temperature resistant and ablation characteristics and rheological and physical properties at least equivalent to those of continuous rayon viscose filament, yet should not otherwise significantly alter the manufacturing process employed for the production of the thermal insulation. Additionally, due to the large and growing quantities of solid propellant rocket motor insulation required by the industry, any such replacement reinforcement precursor candidate should be abundantly available now and into the foreseeable future.

An alternative carbon precursor that has been proposed for ablative applications is continuous filament polyacrylonitrile (PAN). PAN continuous filaments disadvantageously possess higher densities than cellulosic materials (1.8 g/cm$^3$ for PAN, compared to 1.48 g/cm$^3$ for cellulosic filaments) and higher thermal conductivities than cellulosic materials. Thus, in order to provide a comparable insulation performance to rayon filaments, rocket motor nozzle insulation or re-entry vehicle insulation formed from PAN filament must have a greater thickness and weight than a comparable-performing insulation formed from cellulosic materials. The replacement material must meet the ablation limits for protection of the casing (when used as an internal casing insulation) throughout the propellant burn without adding undue weight to the motor.

Accordingly, the search for a functionally satisfactory precursor for making the reinforcement structure of a composite material requires discovery and implementation of an extraordinarily complex combination of characteristics. The criticality of the material selection is further demonstrated by the severity and magnitude of the risk of failure. Most insulation is of necessity "man-rated" in the sense that a catastrophic failure can result in the loss of human life—whether the rocket motor is used as a booster for launch of a rocket or is carried tactically underneath the wing of an attack aircraft. The monetary cost of failure in satellite launches is well-publicized and can run into the hundreds of millions of dollars.

Therefore, one of the most difficult tasks in the solid propellant rocket motor industry is the development of a suitable, acceptable insulation that will meet and pass a large number of test criteria to lead to its acceptability.

Furthermore, any replacement precursor should not be susceptible to obsolescence issues nor discontinuance in future supply thereof.

SUMMARY OF THE INVENTION

It is, therefore, an object of this invention to address a crucial need in the industry to reformulate the ablative liners and thermal liners of rocket motors by finding a suitable replacement precursor for making carbon-based reinforcement structures. As referred to above, suitable replacement means a precursor material that can be substituted for continuous filament viscose rayon without requiring significant amounts of modification to the impregnating resin composition, component design, and manufacturing process steps and, when carbonized, possess equal or superior properties, in particular overall strength, as the those possessed by the continuous filament viscose rayon standard.

In accordance with the principles of this invention, these and other objects of the invention are attained by the provision of a rocket motor ablative material (e.g., an insulation liner or the like) formed from, as a precursor of the carbon reinforcement structure, yarn comprising carded and yarn-spun cellulosic (e.g., rayon) fibers. The inventors discovered that staple cellulosic fibers are capable of being processed, such as by spinning, into yarns which, upon patterning (e.g., weaving in any weave style or winding) and subsequent carbonization, can serve as a reinforcement of prepregs and can be processed into an insulation liner under conditions comparable to those of continuous filament viscose rayon.

The inventors also discovered that when staple cellulosic fibers possessing certain dimensional characteristics are selected, the resulting yarn possesses excellent mechanical strength for rocket motor applications, yet does not release unacceptable levels of fiber fly—i.e., short, waste fibers—into the air in textile processing operations such as carding, spinning, and weaving. The former discovery, in particular, was especially surprising because yarns prepared from cellulosic fibers were expected to possess and do possess significantly lower warp strengths than yarns produced from continuous filament viscose rayon. However, the inventors found that the lower warp strengths of the yarns prepared from cellulosic fibers are compensated for by the far superior across-ply tensile strength that yarns prepared from cellulosic fibers exhibit over continuous filament viscose rayon.

This invention is also directed to a rocket motor assembly comprising ablative materials which comprise reinforcing structures formed from, as a precursor material prior to carbonization, yarn comprising carded and yarn-spun cellulosic fibers. This invention is further directed to a process for making a rocket motor assembly comprising the ablative materials, including nozzle and re-entry vehicle components.

Other objects, aspects and advantages of the invention will be apparent to those skilled in the art upon reading the specification and appended claims which, when taken in conjunction with the accompanying drawings, explain the principles of this invention.

BRIEF DESCRIPTION OF THE DRAWINGS

The accompanying drawings serve to elucidate the principles of this invention. In such drawings.

DETAILED DESCRIPTION OF THE INVENTION

In accordance with the principles of this invention, the replacement precursor material for preparing carbon reinforcement structures of rocket motor ablative materials, including nozzle re-entry vehicle components, is yarn comprising carded and yarn-spun cellulosic fibers, especially semi-synthetic cellulosic fibers. As referred to herein and understood in the art, carded means fibers subjected to a process or passed through a machine designed to promote the at least partial separation and at least partial alignment of fibers. Carding encompasses techniques used in the production of both fine and coarse yarns. As referred to herein and understood in the art, yarn-spun means a yarn formed a combination of drawing or drafting and twisting of prepared fibers. Spinning (or yarn-spinning) as referred to herein is not intended to mean techniques consisting of the extrusion of continuous filaments, which techniques can be performed during solvent-spinning. As referred to herein, staple fibers are fibers having lengths suitable for yarn-spinning.

Various semi-synthetic cellulosic fibers can be used in accordance with this invention. A representative, but non-exhaustive and non-exclusive list of suitable semi-synthetic cellulosic fibers suitable for use in the present invention includes standard non-solvent-spun staple rayon fibers, and solvent-spun cellulosic fibers (such as LYOCELL). Cellulosic fibers as referred to herein include those made of cellulose-derivatives, such as cellulose acetate. As referred to herein, staple fibers are fibers having lengths suitable for spinning.

Figure 3:
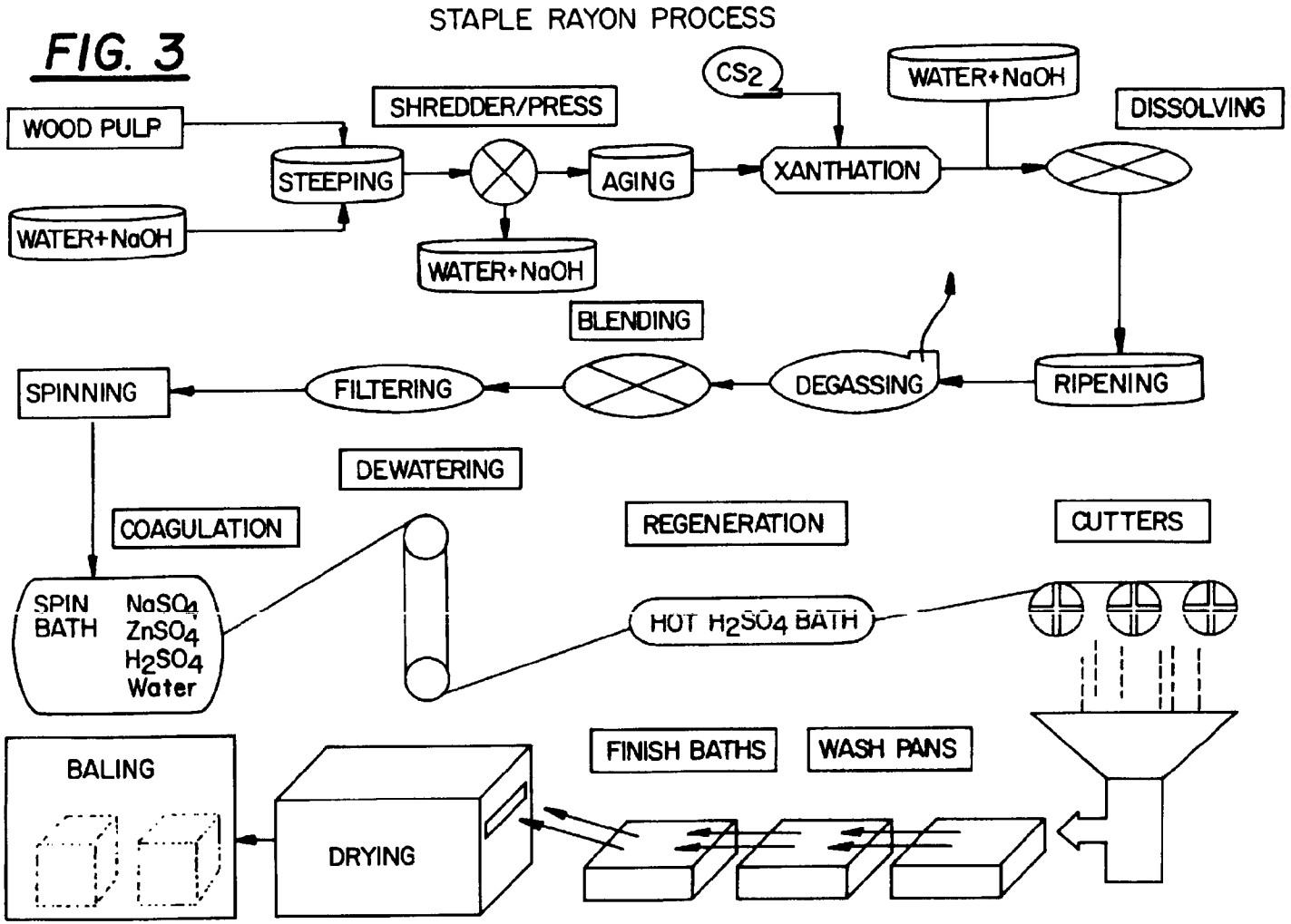
FIG. 3 is a flow diagram of a process for making staple rayon.

In the case of non-solvent-spun staple cellulosic fibers, the fibers preferably have average fiber lengths in a range of from 38 mm to 225 mm, such as 100 mm to 150 mm, and, when processed into a yarn, an average denier per fiber (dpf) in a range of from 1.5 dpf to 9.0 dpf, such as 5 dpf. The solvent-spun cellulosic fibers preferably have comparable fiber lengths to those of the staple cellulosic fibers, but an average denier per fiber (dpf) in a range of from 1.1 dpf to 3.0 dpf. One supplier of both types of cellulosic fibers is Acordis of Axis, AL, which supplies, for example, a fiber with a dpf of 5.5 and length of 15.24 cm (i.e., 6 inches). The staple standard-rayon cellulosic fibers provided from this commercial source generally have sodium and zinc levels of 609 ppm and 10 ppm, respectively, which are less than the 1300 ppm and 300 ppm of typical continuous filament viscose rayon supplied by NARC. Alternatively, staple standard rayon cellulosic fibers can be prepared by conventional processes well known in the art, such as that illustrated in FIG. 3. The solvent-spun cellulosic fibers are also available from Lenzing Fibers of Austria. Solvent-spun cellulosic fibers made by solvent spinning with N-methylmorpholene-N-oxide are commonly known as LYOCELL. The LYOCELL fibers have sodium and zinc levels of 90 ppm and 2 ppm, respectively.

The cellulosic fibers are preferably untreated, meaning that they are free of any distinct metallic, metalloidic, or graphitic coating, at least prior to (and preferably subsequent to) graphitization.

One of the advantageous features of this invention is that the yarn comprising carded and spun cellulosic fibers may be substituted for conventional continuous filament viscose rayon without significantly altering the ablative material manufacturing process. The only substantial alteration in the manufacturing process resides in the differences between producing the yarn of this invention and producing conventional continuous filament viscose rayon. Generally, continuous filament viscose rayon is produced by dissolving cellulose into a viscose spinning solution, and extruding the solution into a coagulating medium where the polymer is cellulose and is regenerated as a continuous filament. On the other hand, the yarn used in the present invention is prepared from staple fibers, which are carded and spun by techniques well known in the industry into a tight, compact yarn from the staple fibers. It is understood that other processing techniques may also be used, such as combing and other steps well known and practiced in the art. Preferably, the spinning step is performed by either a worsted process or cotton-ring spinning process. The spinning process is advantageous to keep yarn hairiness to a minimum. By way of example, the yarn may have a weight comparable to the weight of standard yarns presently used for carbon ablative materials, i.e., about 1650 denier. This may be accomplished with staple fibers by producing a yarn that is approximately 4.8 English worsted count (Nw), and two-plying the yarn to obtain the 1650 denier configuration. Suitable amounts of twist attained by spinning can be, for example, 2-12 360° turns per inch, more preferably 10-12 360° turns per inch.

The yarns are then subject to one or more patterning techniques, including, by way of example, weaving, winding, and plying, into a desired structure. The structure is then carbonized to form the reinforcement of the ablative material. In this regard, the structuring of the yarns into the desired configurations can be performed in the same manner as that for conventional continuous filament viscose rayon. Carbonization can take lace, by way of example, at a temperature of at least 1250° C., preferably at east 1350° C. The carbonized reinforcement structure is then impregnated with an acceptable resin, such as a phenolic resin. A representative phenolic resin is SC1008, available from Borden Chemical of Louisville, Ky.

Figure 1:
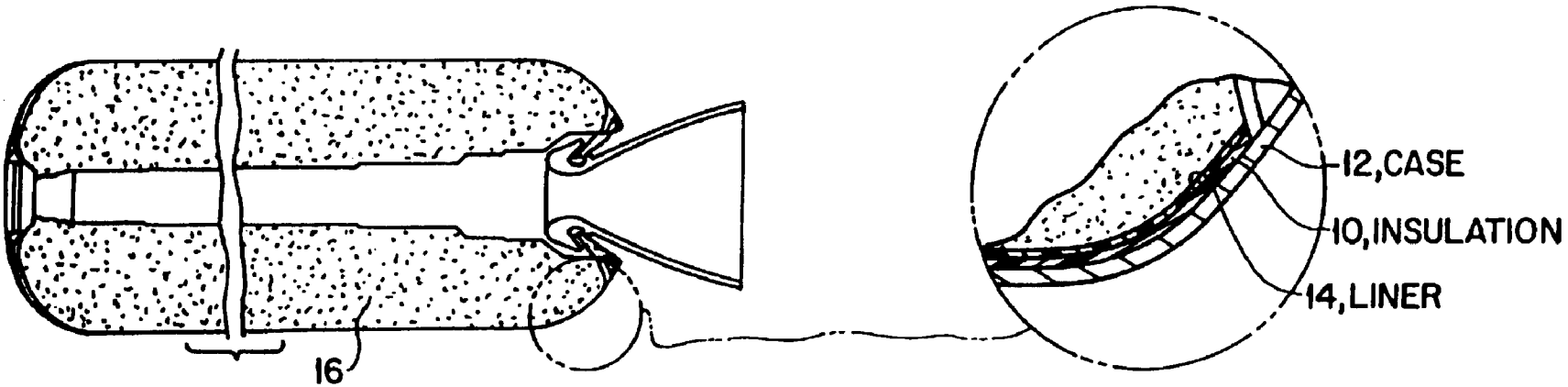
FIG. 1 is a schematic cross-sectional view depicting the insulation of this invention interposed between a rocket motor casing and solid propellant.

The inventive ablative and insulation materials can be applied to various parts of a rocket assembly, preferably as multi-layered structures. For example, the ablative and insulation materials can be used as a chamber internal insulation liner, as shown in FIG. 1. Referring to FIG. 1, the insulation 10, when in a cured state, is disposed on the interior surface of the rocket motor case 12. Typically, a liner 14 is interposed between the propellant 16 and the insulation 10. The insulation 10 and liner 14 serve to protect the case from the extreme conditions produced by the burning propellant 16. Methods for loading a rocket motor case 12 with an insulation 10, liner 14, and propellant 16 are known to those skilled in the art, and can be readily adapted within the skill of the art without undue experimentation to incorporate the insulation of this invention. Liner compositions and methods for applying firers into a rocket motor case are also well known in the art, as exemplified by U.S. Pat. No. 5,767,221, the complete disclosure of which is incorporated herein by reference.

Figure 2:
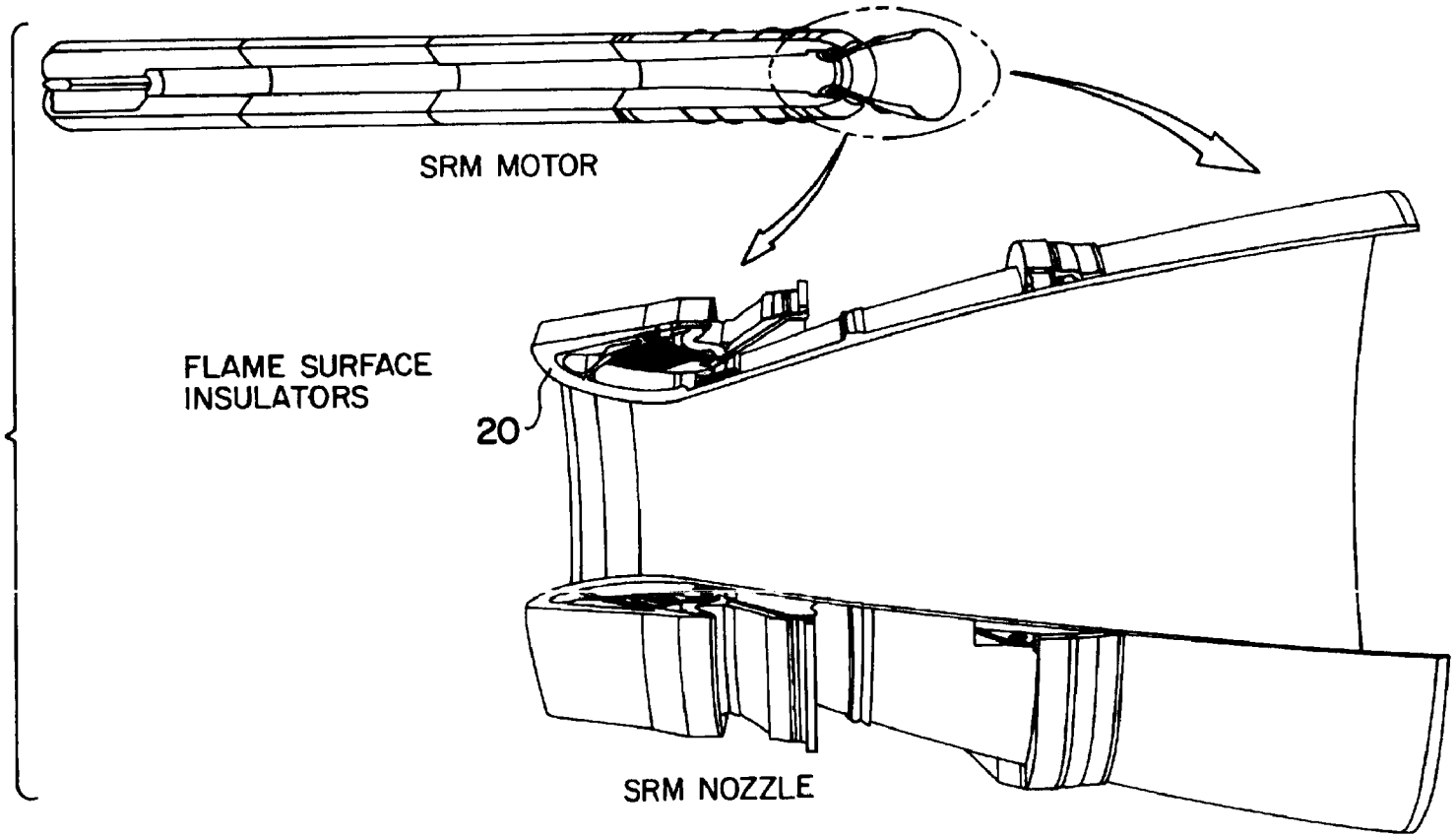
FIG. 2 is a schematic cross-sectional view identifying some of the regions of a rocket motor assembly in which the insulation of this invention may be applied.

The ablative and insulation materials can also (or alternatively) be applied along the flow path through which the combustion products pass, such as shown by the shaded area 20 of the exit nozzle shown in FIG. 2.

The ablative performance and mechanical properties of the carbon cloth phenolic prepared from cellulosic fibers as a precursor to the reinforcement are comparable those of carbon cloth phenolics made from the aerospace-grade continuous filament viscose rayon in subscale test motors. For example, although carbonized yarns formed from staple cellulosic fibers exhibit a slightly lower warp strength than yarns formed from continuous filament viscose rayon (96.5 MPa (that is, 14,000 lbs/in$^2$) compared to 144.8 MPa (that is, 21,000 lbs/in$^2$)), carbonized yarns formed from staple cellulosic fibers have an across-ply strength (5.52 MPa or 800 lbs/in$^2$) twice that of continuous filament viscose rayon (2.76 MPa or 400 Ibs/in$^2$) (at rocket firing temperatures). Although this invention is not currently intended to be limited by any theory, it is believed that the enhanced across-ply tensile strength of the inventive ablative material is attributable to the orientation of fibers being offset relative to the yarn axis. As a result, the ends of fibers forming the yarn can entangle with the fibers of an adjacent layer of yarn, thereby increasing the shear strength between the layers of yarn.

This invention will now be described with reference to the following examples, which are neither exhaustive nor exclusive of the scope of this invention.

EXAMPLES

Example 1

3.0 denier per filament (dpf) viscose rayon staple fibers having an average length of about 51 mm were spun into yarns using a cotton ring spinning machine. The resulting yarns had a denier of about 825.

Example 2

5.5 dpf viscose rayon staple fibers having an average length of about 150 mm were spun into yarns having an average denier of about 825 using a worsted spinning machine of the type designed to handle long, heavy fibers that can be spun into heavy tows commonly used to make upholstery fabrics.

Example 3

3.0 dpf LYOCELL staple fibers having an average length of about 51 mm were spun into yarns having an average denier of about 825 using a cotton ring spinning machine.

Example 4

3.0 dpf LYOCELL staple fibers having an average length of about 100 mm were spun into a yarn having denier of about 825 a using a worsted wool spinning machine.

For each of Examples 1-4, the yarns were spun into heavy tow yarns each having a denier of about 825. This was accomplished by making a Ne (Number English) 6.4 spun yarn. By two-plying (twisting) the yarn into a Ne 3.2 yarn, a denier of 1650 was obtained. The resulting yarns were then woven into fabric in a square woven having a 5 harness satin configuration. The fabrics were then carbonized using the standard carbonization schedules used for ablative carbon fabric filament cellulosic fibers.

The carbonized fabric was impregnated with a phenolic resin, and in particular phenol formaldehyde resole resin. The prepreg material was 31.0-36.0 wt % resin, 13.0-17.5 wt % carbon black filler, and 46.5 to 56.0 wt % carbon fabric.

The following table lists the thermal and mechanical properties of various yarns, carbon cloths, and carbon cloth phenolic ablative materials tested to compare staple cellulosic precursors with current filament rayon precursors.

TABLE 1

Properties of Filament and Staple Cellulosic Fibers in Carbon Cloth Phenolic Ablatives

| | Units | Filament Rayon | Staple Viscose Rayon (Example 2) | Staple LYOCELL (Example 3) |
|---|---|---|---|---|
| **Yarn Properties** | | | | |
| Yarn Denier | g/9 KM | 1650 | 1650 | 1650 |
| Yarn Plies | Ply | 1 | 2 | 2 |
| Fibers per Yarn | | 720 | 300 | 550 |
| Denier per Filament | Dpf | 2.3 | 5.5 | 3.0 |
| **Woven Fabric Properties** | | | | |
| Fabric Width | cm | 152 | 152 | 152 |
| | (inches) | (60) | (60) | (60) |
| Area Weight | $g/m^2$ | 576 | 576 | 576 |
| | $(oz/yd^2)$ | (17.0) | (17.0) | (17.0) |
| Weave Pattern | | 8 harness satin | 5 harness satin | 5 harness satin |
| **Carbon Fabric Properties** | | | | |
| Fabric Width | cm | 109 | 109 | 117 |
| | (inches) | (43) | (43) | (46) |
| Area Weight | $g/m^2$ | 271 | 271 | 271 |
| | $(oz/yd^2)$ | (8.0) | (8.0) | (8.0) |
| Carbon Content | % | 97.7 | 95.7 | 95.7 |
| **Prepreg Properties** | | | | |
| Carbon Content | % | 50.6 | 47.6 | 45.6 |
| Resin Content | % | 34.2 | 36.3 | 38.4 |
| Filler Content | % | 15.2 | 16.1 | 17.0 |
| **Cured Composite and Ablative Properties** | | | | |
| Across Ply Tensile (@ 21° C. or 70° F.) | MPa | 26.5 | 33.6 | 32.2 |
| | (psi) | (3837) | (4870) | (4665) |
| Across Ply Tensile (@ 399° C. or 750° F.) | MPa | 2.12 | 4.43 | 5.21 |
| | (psi) | (307) | (643) | (756) |
| Interlaminar Shear Strength | MPa | 39.7 | 50.9 | 50.1 |
| | (psi) | (5760) | (7385) | (7267) |
| Nozzle Erosion Rate* | μm/s | 171 | 171 | 173 |
| | (mils/s) | (6.74) | (6.74) | (6.82) |
| Total Heat Effected Depth* | mm | 14.1 | 12.5 | 13.1 |
| | (inches) | (0.556) | (0.494) | (0.516) |

*Based upon solid fuel rocket motor test firing of 35 seconds at 6.2 MPa (900 psi).

As shown in the above Table, the carbon cloth phenolic ablatives formed from staple fibers in accordance with this present invention exhibited much higher across ply tensile strengths than the conventional continuous filament viscose rayon precursor at room temperature of 21° C. and operating temperatures of 399° C.

The foregoing detailed description of the preferred embodiments of the invention has been provided for the purposes of illustration and description. It is not intended to be exhaustive or exclusive in its description of the precise embodiments disclosed. The embodiments were chosen and described in order to best explain the principles of the invention and its practical application, thereby enabling others skilled in the art to understand the invention for various embodiments and with various modifications covered within the spirit and scope of the appended claims.

We claim:

1. A method for insulating or thermally protecting a rocket motor assembly comprising a rocket motor casing containing a solid propellant, and a nozzle assembly coupled to the rocket motor casing, said process comprising (a) forming a rocket motor insulation from a prepreg comprising at least one resin matrix impregnated into a carbonized reinforcement, the carbonized reinforcement being formed from, as a precursor prior to carbonization, carded and yarn-spun staple cellulosic fibers and (b) insulating a portion of the rocket motor assembly with the rocket motor ablative material.

2. The process of claim 1, wherein the staple cellulosic fibers comprise non-solvent-spun rayon fibers.

3. The process of claim 2, wherein the non-solvent-spun rayon fibers have an average length in a range of from 38 mm to 225 mm, and are spun into yarn having a denier per fiber in a range of from 1.5 dpf to 9.0 dpf.

4. The process of claim 1, wherein the staple cellulosic fibers are formed from a cellulose-derivative.

5. The process of claim 1, wherein the staple cellulosic fibers are untreated.

6. The process of claim 1, wherein said insulating comprises applying the rocket motor ablative material between the solid propellant and the casing surrounding the solid propellant.

7. The process of claim 1, wherein said insulating comprises applying the ablative material as a bulk ablative material of an exit nozzle liner.

8. The process of claim 1, wherein said insulating comprises applying the ablative material as a bulk ablative material of a reentry vehicle nose cone.

9. The process of claim 1, further comprising carbonizing the prepreg at at least 1350° C.

10. The process of claim 1, wherein the prepreg comprises 31.0-36.0 wt % phenolic resin, 13.0-17.5 wt % carbon black filler, and 46.5 to 56.0 wt % carbon fabric.

11. Rocket motor insulation comprising a prepreg, said prepreg comprising at least one carbonized reinforcement structure impregnated with at least one resin, said reinforcement structure being formed from, as a precursor prior to carbonization, carded and spun cellulosic fibers.

12. The rocket motor insulation of claim 11, wherein the staple cellulosic fibers comprise non-solvent-spun rayon fibers.

13. The rocket motor insulation of claim 12, wherein the non-solvent spin rayon fibers have an average length in a range of from 38 mm to 225 mm, and the yarn has a denier per fiber in a range of from 1.5 dpf to 9.0 dpf.

14. The rocket motor insulation of claim 11, wherein the staple cellulosic fibers are formed from a cellulosic derivative.

15. The rocket motor insulation of claim 11, wherein the staple cellulosic fibers are untreated.

16. A rocket motor assembly comprising the insulation of claim 11.

17. The rocket motor assembly of claim 16, wherein the insulation is constructed and arranged as a bulk insulation of an exit nozzle liner.

18. The rocket motor assembly of claim 16, wherein the insulation is constructed and arranged as a bulk insulation of a re-entry vehicle nose cone.

19. The rocket motor assembly of claim 16, wherein the insulation is interposed between a solid propellant and casing of the rocket motor assembly.

20. The process of claim 1, wherein said insulating comprises lining the portion of the rocket motor assembly.

*21. A method of thermally protecting a vehicle, the method comprising;*

*forming an ablative material comprising at least one resin matrix impregnated into a carbonized reinforcement including forming the at least one carbonized reinforcement from, as a precursor prior to carbonization, carded and yarn-spun staple cellulosic fibers; and*

*insulating at least a portion of the vehicle including applying the ablative material to the at least a portion of the vehicle.*

*22. A method of thermally protecting a surface exposed to combustion products, the method comprising:*

*forming an ablative material comprising at least one resin matrix impregnated into a carbonized reinforcement including forming the at least one carbonized reinforcement from, as a precursor prior to carbonization, carded and yarn-spun staple cellulosic fibers; and*

*insulating at least a portion of a surface along an expected flow path of the combustion products, insulating the at least a portion of the surface including applying the ablative material to the at least a portion of the surface along the expected flow path.*

* * * * *